United States Patent
Olczak

(10) Patent No.: US 12,221,894 B2
(45) Date of Patent: Feb. 11, 2025

(54) COMPRESSOR WITH ANTI-ICE INLET

(71) Applicant: General Electric Company Polska sp. z o.o., Warsaw (PL)

(72) Inventor: Dariusz Olczak, Warsaw (PL)

(73) Assignee: General Electric Company Polska sp. z o.o., Warsaw (PL)

( * ) Notice: Subject to any disclaimer, the term of this patent is extended or adjusted under 35 U.S.C. 154(b) by 0 days.

(21) Appl. No.: 18/307,450

(22) Filed: Apr. 26, 2023

(65) Prior Publication Data

US 2024/0318577 A1 Sep. 26, 2024

(30) Foreign Application Priority Data

Mar. 20, 2023 (PL) ...................................... P 444129

(51) Int. Cl.
*F01D 25/02* (2006.01)
*F02C 7/04* (2006.01)
*F02K 3/00* (2006.01)

(52) U.S. Cl.
CPC ................ *F01D 25/02* (2013.01); *F02C 7/04* (2013.01); *F02K 3/00* (2013.01); *F05D 2220/36* (2013.01)

(58) Field of Classification Search
CPC . F01D 25/02; F01D 9/04; F01D 9/041; F02C 7/04; F02C 7/047; F02C 7/057; B64D 2033/0233
USPC ........................................................ 60/39.093
See application file for complete search history.

(56) References Cited

U.S. PATENT DOCUMENTS

| | | | |
|---|---|---|---|
| 2,510,170 A | 6/1950 | Chillson et al. | |
| 2,672,281 A * | 3/1954 | Redding | F02C 7/047 415/200 |
| 2,718,350 A * | 9/1955 | Burgess | F02C 7/047 415/169.2 |
| 2,746,671 A * | 5/1956 | Newcomb | F02C 7/047 415/121.2 |
| 2,994,196 A * | 8/1961 | Bonsall | F23R 3/60 60/752 |
| 3,123,283 A | 3/1964 | Leis | |
| 3,262,636 A * | 7/1966 | Palfreyman | F02C 7/047 415/115 |

(Continued)

FOREIGN PATENT DOCUMENTS

FR 2980537 A1 3/2013
FR 2992346 A1 12/2013

(Continued)

*Primary Examiner* — Alain Chau
(74) *Attorney, Agent, or Firm* — Dority & Manning, P.A.

(57) ABSTRACT

A compressor comprises a rotor shaft including a forward end portion. The forward end portion defines an outer surface. A first row of compressor rotor blades is coupled to the rotor shaft downstream from the forward end portion. An outer casing at least partially surrounds the first row of compressor rotor blades and the outer surface of the forward end portion of the rotor shaft. The outer casing at least partially defines an inlet to the compressor. An inlet guide vane comprises a mounting portion, a tip portion, a leading-edge portion, and a trailing-edge portion. The mounting portion is coupled to the outer casing upstream from the first row of compressor rotor blades. The tip portion extends towards the outer surface of the forward end portion of the rotor shaft. A radial gap is defined between the tip portion and the outer surface.

20 Claims, 8 Drawing Sheets

(56) References Cited

U.S. PATENT DOCUMENTS

| | | | |
|---|---|---|---|
| 4,169,692 A | 10/1979 | McDonough et al. | |
| 4,278,398 A | 7/1981 | Hull | |
| 4,460,315 A | 7/1984 | Tseng et al. | |
| 7,452,184 B2 * | 11/2008 | Durocher | F01D 5/147 |
| | | | 416/193 A |
| 7,762,766 B2 | 7/2010 | Shteyman et al. | |
| 9,169,830 B2 | 10/2015 | Weitkamp et al. | |
| 9,605,545 B2 | 3/2017 | Grohens et al. | |
| 9,708,929 B2 * | 7/2017 | Szwedowicz | F01D 25/02 |
| 10,107,108 B2 | 10/2018 | Jones et al. | |
| 10,415,576 B2 | 9/2019 | Braun et al. | |
| 10,458,396 B2 | 10/2019 | Philipsen et al. | |
| 10,563,513 B2 | 2/2020 | Kalitzin et al. | |
| 10,578,027 B1 | 3/2020 | MacDougall et al. | |
| 10,662,809 B2 * | 5/2020 | Pitt | F01D 25/12 |
| 10,815,884 B2 * | 10/2020 | Ward | B64D 15/04 |
| 11,118,457 B2 * | 9/2021 | Ivakitch | F04D 29/58 |
| 11,698,024 B1 * | 7/2023 | Menheere | F02C 7/047 |
| | | | 415/1 |
| 2001/0026758 A1 | 10/2001 | Bartholoma et al. | |
| 2008/0273982 A1 | 11/2008 | Chunduru et al. | |
| 2012/0076641 A1 | 3/2012 | Jarrett, Jr. et al. | |
| 2012/0099992 A1 | 4/2012 | Strock et al. | |
| 2013/0045088 A1 | 2/2013 | Baumann | |
| 2014/0366552 A1 * | 12/2014 | Szwedowicz | F02C 7/047 |
| | | | 60/39.093 |
| 2015/0218955 A1 | 8/2015 | Bintz et al. | |
| 2016/0010475 A1 | 1/2016 | Alvanos | |
| 2016/0017803 A1 * | 1/2016 | Ward | B64D 15/04 |
| | | | 60/39.093 |
| 2017/0298760 A1 | 10/2017 | Vallino | |
| 2018/0328207 A1 | 11/2018 | Alvanos | |
| 2019/0048798 A1 | 2/2019 | Slawinska et al. | |
| 2019/0301488 A1 * | 10/2019 | Batch | F04D 29/547 |
| 2020/0095933 A1 | 3/2020 | Tang et al. | |
| 2021/0115795 A1 * | 4/2021 | Ivakitch | F02C 7/047 |
| 2022/0154589 A1 * | 5/2022 | Galoul | F01D 9/065 |
| 2022/0162958 A1 | 5/2022 | Poick | |

FOREIGN PATENT DOCUMENTS

| | | | | |
|---|---|---|---|---|
| FR | 2995305 A1 | 3/2014 | | |
| GB | 1314162 A | 4/1973 | | |
| GB | 2038425 A | * 7/1980 | | F02C 7/04 |
| RU | 177516 U1 | 2/2018 | | |
| WO | WO2018219611 A1 | 12/2018 | | |

* cited by examiner

COMPRESSOR WITH ANTI-ICE INLET

PRIORITY INFORMATION

The present application claims priority to Polish Patent Application Number P.444129 filed on Mar. 20, 2023.

FIELD

The present disclosure relates to a gas turbine engine. More particularly, this disclosure relates to an anti-ice component for a compressor of a gas turbine engine.

BACKGROUND

Gas turbine engines, such as a turboprop engine, may be used for aircraft propulsion. Turboprop engines generally include a fan section and a turbomachine or core engine. The core engine includes an inlet section that is defined upstream from a compressor section. The inlet section generally includes an annular array of non-rotating inlet guide vanes which condition or guide a flow of air as it enters the compressor section. During certain ground and flight conditions, ice may build up around these non-rotating or stationary inlet guide vanes and/or along an inner wall of the inlet section. Ice buildup may negatively affect engine operation and performance.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
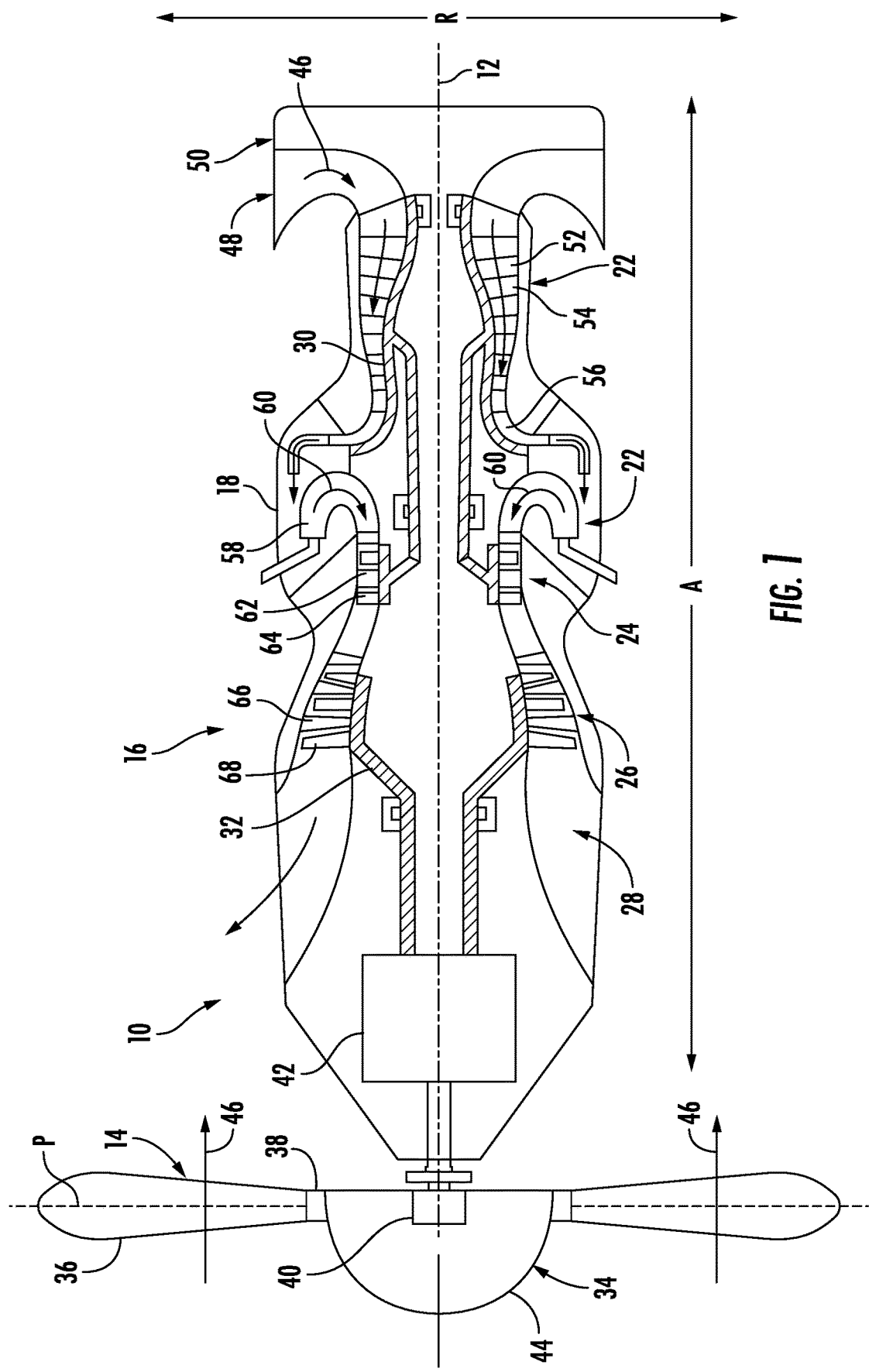
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "axial" and "axially" refer to directions and orientations that extend substantially parallel to a reference axis. Moreover, the terms "radial" and "radially" refer to directions and orientations that extend substantially perpendicular to the reference axis. In addition, as used herein, the terms "circumferential" and "circumferentially" refer to directions and orientations that extend arcuately about the reference axis.

The terms "high/low speed" and "high/low-pressure" are used with respect to the high-pressure/high speed system and low-pressure/low speed system interchangeably. Further, it will be appreciated that the terms "high" and "low" are used in this same context to distinguish the two systems and are not meant to imply any absolute speed and/or pressure values.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

As will be discussed in more detail below, the subject matter of the present disclosure is directed generally to an inlet guide vane, such as an inlet guide vane to a compressor of a gas turbine engine. Inlet guide vanes are statically mounted to a static structural portion of the engine and are non-rotating or circumferentially stationary with respect to a rotating shaft of the gas turbine engine during engine operation. Inlet guide vanes condition or guide airflow into the compressor.

During operation, the compressor inlet guide vanes (IGVs) may be exposed to below freezing environments which may result in ice formation and buildup on or around the inlet guide vanes, particularly along an inner radial surface of the inlet where the engine inlet is curved, and the inlet guide vane is coupled to an inner surface of the inlet. Ice buildup at the inlet may be non-uniform due to engine operating conditions and/or the shape of the engine inlet. Additionally, when a heated part is present upstream of the vanes, ice crystal icing risk is elevated.

The present disclosure provides an inlet guide vane that is cantilever mounted to an outer casing and extends radially inwardly towards an outer surface of a forward end portion of a rotor shaft. A tip portion of the inlet guide vane extends radially inwardly towards but does not touch the outer surface of the rotor shaft so as to form a radial gap therebetween. Ice formation is inhibited or mitigated by allowing the rotor shaft to spin beneath the tip portion of the inlet guide vane.

In particular embodiments, purge air is introduced directly into the radial gap and impinges on the tip portion of the inlet guide vane thereby reducing or preventing the formation of ice along the inlet guide vane particularly near the tip portion upstream from an inlet to the compressor. In other embodiments, purge air is introduced upstream from the radial gap flows against the leading edge of the inlet guide vane proximate to the radial gap, thereby reducing or preventing the formation of ice along the inlet guide vane and/or an inner surface of an inlet frame upstream from an inlet to the compressor. In other embodiments, the inlet guide vane includes internal air passages and one or more outlets defined along the tip portion and/or along the leading edge portion of the inlet guide vane.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a reverse-flow turboprop engine 10, referred to herein as "turboprop engine 10." As shown in FIG. 1, turboprop engine 10 defines an axial direction A (extending parallel to a longitudinal centerline or central axis 12 provided for reference), a radial direction R, and a circumferential direction C (not shown) disposed about the axial direction A. Turboprop engine 10 generally includes a propeller section 14 and a core turbine engine 16 disposed downstream from the propeller section 14, the propeller section 14 being operable with, and driven by, core turbine engine 16.

Though the embodiment of FIG. 1 illustrates a unducted reverse-flow turboprop engine, it will be appreciated that other types of gas turbine engines are contemplated herein for the discussion that follows. For example, it will be understood that turbojet engines, ducted turbofan engines, turbofan engines, gas turbine engines with centrifugal compressors, etc. are all contemplated for use with the various embodiments of inlet guide vanes depicted herein. No limitation is intended unless otherwise required as to the type of gas turbine engines useful with the inlet guide vanes described herein.

As shown in FIG. 1, the core turbine engine 16 depicted generally includes outer casing 18 that is substantially tubular and that extends generally along axial direction A. Outer casing 18 generally encloses core turbine engine 16 and may be formed from a single casing or multiple casings. Core turbine engine 16 includes, in a serial flow relationship, a compressor or high-pressure ("HP") compressor 20, a combustion section 22, a high-pressure ("HP") turbine 24, a low-pressure ("LP") turbine 26, and an exhaust section 28. An air flow path generally extends through the HP compressor 20, combustion section 22, HP turbine 24, LP turbine 26, and exhaust section 28 which are in fluid communication with each other.

The turboprop engine 10 includes one or more rotor shafts. In the exemplary turboprop engine 10 shown in FIG. 1, a first rotor shaft 30 drivingly connects the HP turbine 24 to the HP compressor 20. In exemplary embodiments, the first rotor shaft 30 is a high-pressure ("HP") shaft or spool. A second rotor shaft 32 drivingly connects the LP turbine 26 to propeller section 14 of the turboprop engine 10. In the exemplary embodiment shown in FIG. 1, the second rotor shaft 32 is a low-pressure ("LP") shaft or spool. For the embodiment depicted, propeller section 14 includes a variable pitch fan 34 having a plurality of propeller blades 36 coupled to a disk 38 in a spaced apart manner. As depicted, the propeller blades 36 extend outwardly from disk 38 generally along the radial direction R. Each propeller blade 36 is rotatable relative to the disk 38 about a pitch axis P by virtue of the propeller blades 36 being operatively coupled to an actuation member 40 configured to collectively vary the pitch of the propeller blades 36 in unison. The propeller blades 36, disk 38, and actuation member 40 are together rotatable about the longitudinal centerline or central axis 12 by the second rotor shaft 32 across a power gear box 42. The power gear box 42 includes a plurality of gears for stepping down the rotational speed of the second rotor shaft 32 to a more efficient rotational fan speed and is attached to one or both of a core frame or a fan frame through one or more coupling systems. Disk 38 is covered by a rotatable spinner or front hub 44 aerodynamically contoured to promote an airflow through the plurality of propeller blades 36.

During operation of the turboprop engine 10, a volume of air 46 passes through propeller blades 36 of variable pitch fan 34 and is urged or guided toward a radial inlet 48 of core turbine engine 16. More specifically, turboprop engine 10 includes an inlet frame 50 that defines radial inlet 48 that routes an inlet portion of the flow of air 46 from radial inlet 48 downstream to the HP compressor 20. HP compressor 20 includes one or more sequential stages of compressor stator vanes 52, one or more sequential stages of compressor rotor blades 54, and an impeller 56. The one or more sequential stages of compressor stator vanes 52 are coupled to the outer casing 18 and compressor rotor blades 54 are coupled to the first rotor shaft 30 to progressively compress the flow of air 46. Impeller 56 further compresses the air 46 and directs the air 46 into combustion section 22 where air 46 mixes with fuel. Combustion section 22 includes a combustor 58 which combusts the air/fuel mixture to provide combustion gases 60.

Combustion gases 60 flow through HP turbine 24 which includes one or more sequential stages of turbine stator vanes 62 and one or more sequential stages of turbine rotor blades 64. The one or more sequential stages of turbine stator vanes 62 are coupled to the outer casing 18 and turbine rotor blades 64 are coupled to the first rotor shaft 30 extract thermal and/or kinetic energy therefrom. Combustion gases 60 subsequently flow through LP turbine 26, where an additional amount of energy is extracted through additional stages of turbine stator vanes 66 and turbine rotor blades 68 coupled to the second rotor shaft 32. The energy extraction from HP turbine 24 supports operation of the HP compressor 20 through the first rotor shaft 30 and the energy extraction from LP turbine 26 supports operation of propeller section 14 through the second rotor shaft 32. Combustion gases 60 exit the turboprop engine 10 through exhaust section 28.

It should be appreciated that the turboprop engine 10 depicted in FIG. 1 is by way of example only and that in other exemplary embodiments, turboprop engine 10 may have any other suitable configuration. For example, it should be appreciated that in other exemplary embodiments, turboprop engine 10 may instead be configured as any other suitable turbine engine, such as a turbofan engine, turbojet engine, internal combustion engine, etc. Furthermore, although turboprop engine 10 described above is an aeronautical gas turbine engine for use in a fixed-wing or rotor aircraft, in other exemplary embodiments, turboprop engine 10 may be configured as any suitable type of gas turbine engine that used in any number of applications, such as a land-based, industrial gas turbine engine, or an aeroderivative gas turbine engine.

In addition, in other exemplary embodiments, the turbine engine may include any suitable number of compressors, turbines, shafts, etc. For example, as will be appreciated, the first rotor shaft 30 and second rotor shaft 32 may further be coupled to any suitable device for any suitable purpose. For example, in certain exemplary embodiments, turboprop engine 10 of FIG. 1 may be utilized to drive a propeller of a helicopter, may be utilized in aeroderivative applications, or may be attached to a propeller for an airplane. Additionally, in other exemplary embodiments, turboprop engine 10 may include any other suitable type of combustor, and may not include the exemplary reverse flow combustor depicted.

Figure 2:
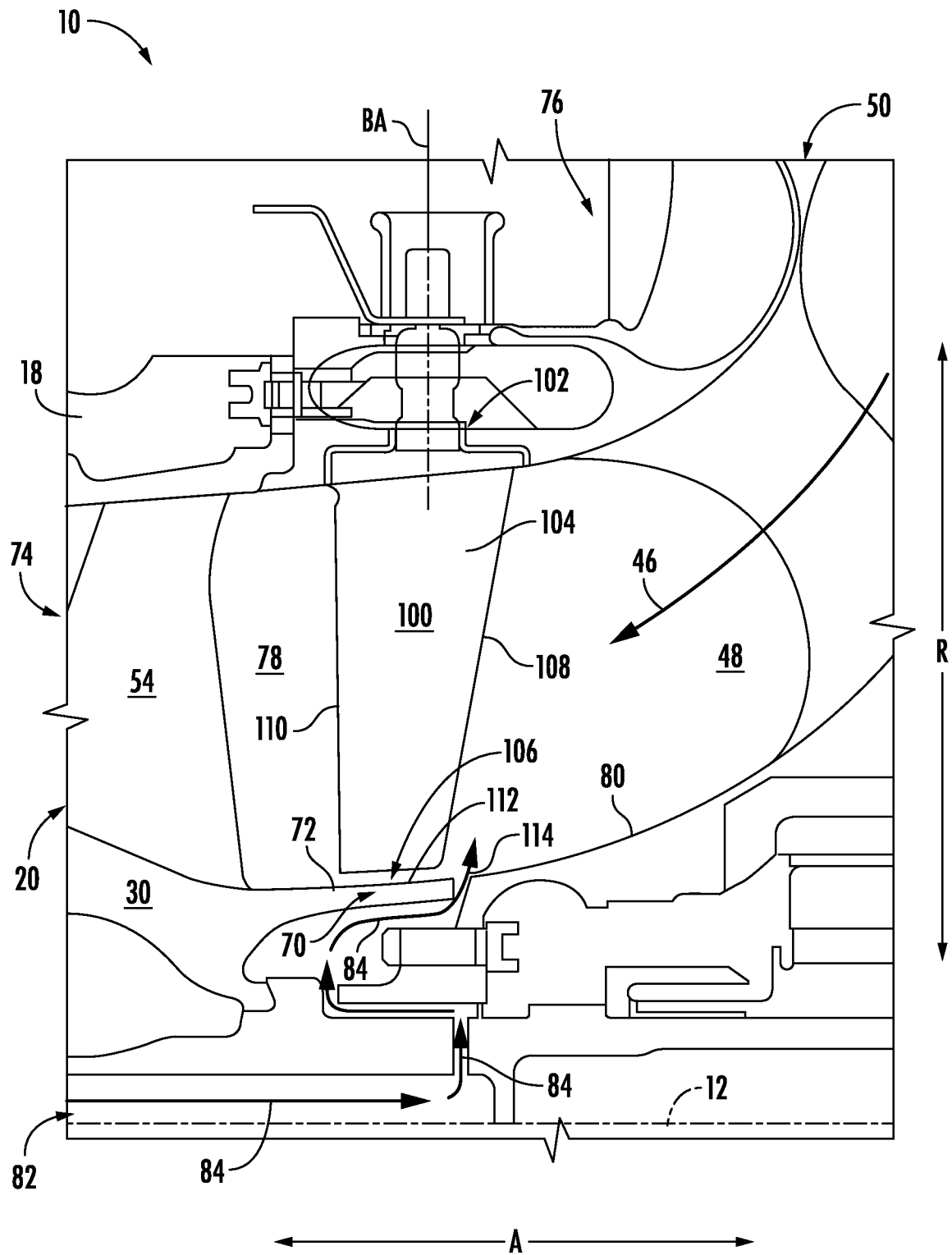
FIG. 2 is an enlarged schematic cross-sectional view of a portion of the gas turbine engine as shown in FIG. 1, including a portion of the inlet frame and a portion of the HP compressor in accordance with an exemplary embodiment of the present disclosure.

FIG. 2 is an enlarged schematic cross-sectional view of a portion of the gas turbine engine as shown in FIG. 1, including a portion of the inlet frame 50 and a portion of the HP compressor 20 in accordance with an exemplary embodiment of the present disclosure. As shown in FIG. 2, a forward end portion 70 of the first rotor shaft 30 defines an outer surface 72. A first stage or first row 74 of compressor rotor blades 54 (only one shown in FIG. 2) is coupled to the first rotor shaft 30 downstream from the forward end portion 70. An outer casing 76 such as a portion of the outer casing 18 and/or a portion of the inlet frame 50 at least partially surrounds the first row 74 of compressor rotor blades 54 and the outer surface 72 of the forward end portion 70 of the first rotor shaft 30. The outer casing 76 at least partially defines a compressor inlet 78 to the HP compressor 20.

In exemplary embodiments, an inlet guide vane 100 is positioned upstream from the first row 74 of compressor rotor blades 54. The inlet guide vane 100 is not rotatable about the longitudinal centerline or central axis 12 of the turboprop engine 10. It is to be understood that although only one inlet guide vane 100 is shown in FIG. 2, the turboprop engine 10 may include a plurality of inlet guide vanes 100 annularly arranged about the longitudinal centerline or central axis 12 and the forward end portion 70 of the first rotor shaft 30. As shown in FIG. 2, the inlet guide vane 100 includes or defines a base or mounting portion 102, a vane body 104 extending radially inwardly with respect to radial direction R from the mounting portion 102, a tip portion 106 radially spaced from the mounting portion 102, a leading-edge portion 108, and a trailing-edge portion 110 defined downstream from the leading-edge portion 108.

The mounting portion 102 is coupled to the outer casing 76 upstream from the first row 74 of compressor rotor blades 54. The inlet guide vane 100 may be rotatable about a respective blade axis "BA" or may be fixed in position. In the exemplary embodiment shown in FIG. 2, the tip portion 106 extends towards but does not touch the outer surface 72 of the forward end portion 70 of the first rotor shaft 30 so as to define a radial gap 112 between the tip portion 106 and the outer surface 72 of the forward end portion 70 of the first rotor shaft 30. In this mounting configuration, the inlet guide vane 100 is only fixed or constrained at the mounting portion 102 or in other words, it is cantilevered from the outer casing 76. In the embodiment shown in FIG. 2, the forward end portion 70 of the first rotor shaft 30, particularly the outer surface 72, is allowed to spin beneath the tip portion 106 of the inlet guide vane 100, thereby breaking up and/or preventing ice buildup within the radial inlet 48 at the inlet guide vane 100 upstream from the compressor inlet 78.

In one exemplary embodiment as shown in FIG. 2, an axial gap or aperture 114 is defined between the forward end portion 70 of the first rotor shaft 30 and an inner surface or inner wall 80 of the inlet frame 50 upstream from the inlet guide vane 100. In this embodiment, the forward end portion 70 of the first rotor shaft 30 terminates axially forward of the leading-edge portion 108 of the inlet guide vane 100. The aperture 114 is in fluid communication with a purge or extraction-air source 82 such as the HP compressor 20. The aperture 114 is oriented to direct a flow of purge- or heated compressed air, indicated by arrows 84, towards the radial gap 112. In this embodiment, the forward end portion 70 of the first rotor shaft 30, particularly the outer surface 72, is allowed to spin beneath the tip portion 106 of the inlet guide vane 100 and the heated compressed air 84 is directed towards and drawn into the radial gap 112, thereby breaking up and/or preventing ice buildup within the radial inlet 48 at the inlet guide vane 100 upstream from the compressor inlet 78.

Figure 3:
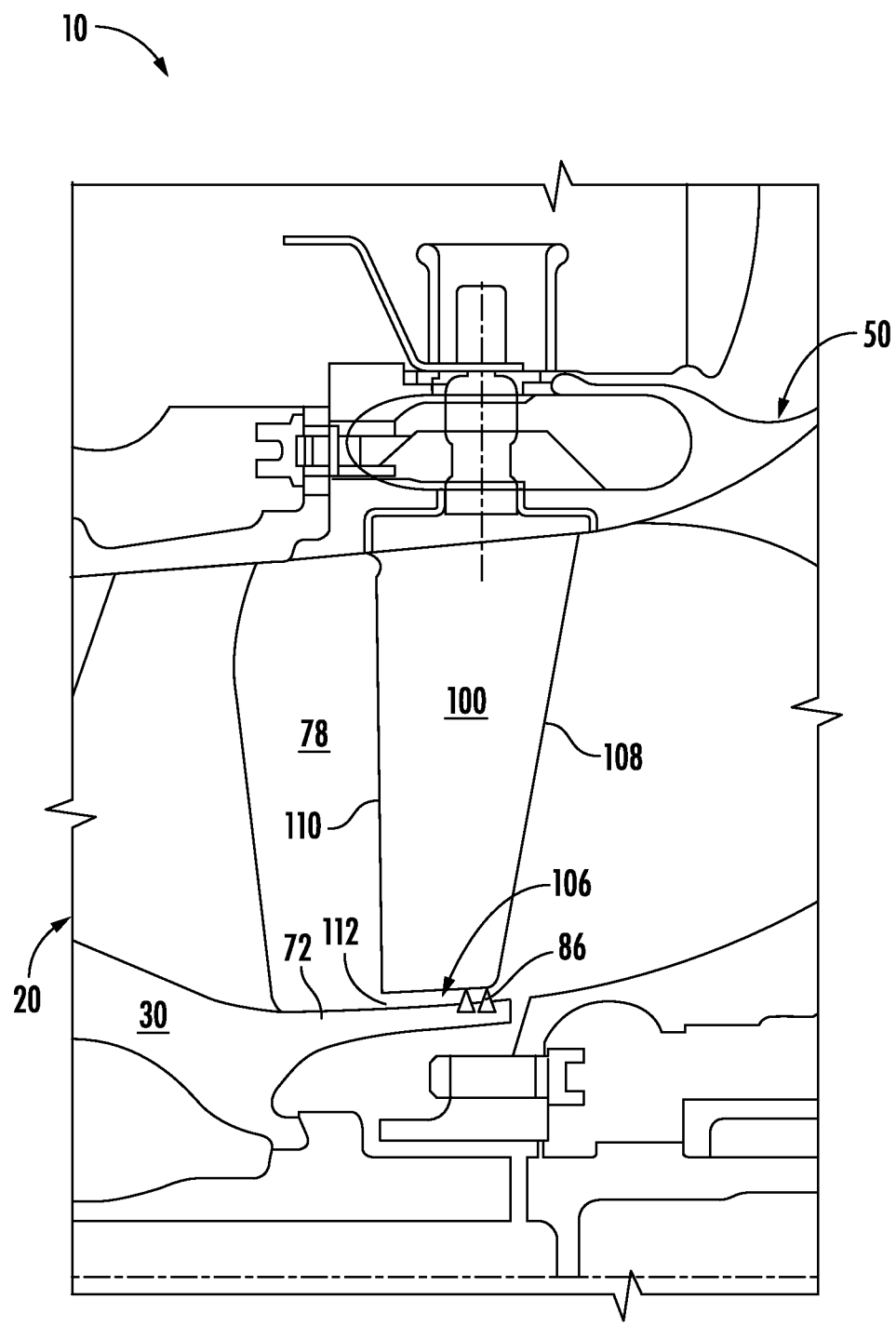
FIG. 3 is an enlarged schematic cross-sectional view of a portion of the gas turbine engine as shown in FIG. 1, including a portion of the inlet frame and a portion of the HP compressor in accordance with an exemplary embodiment of the present disclosure.

FIG. 3 is an enlarged schematic cross-sectional view of a portion of the gas turbine engine as shown in FIG. 1, including a portion of the inlet frame 50 and a portion of the HP compressor 20 in accordance with an exemplary embodiment of the present disclosure. The various components shown in FIG. 3 are similar to or the same as those shown in FIG. 2 and described herein and are numbered likewise. As shown in FIG. 3, a seal body 86 may be disposed and extend radially between the tip portion 106 of the inlet guide vane 100 and the outer surface 72 of the forward end portion 70 of the first rotor shaft 30. The seal body 86 may be positioned at least partially between the leading-edge portion 108 and the trailing-edge portion 110 of the inlet guide vane 100. The seal body 86 may be attached to the inlet guide vane 100, to the outer surface 72 of the forward end portion 70 of the first rotor shaft 30, or to both. In an exemplary embodiment, the seal body 86 may be incorporated into the embodiment shown in FIG. 2, thereby preventing, or reducing flow of the heated compressed air 84 flowing through the radial gap 112.

In this embodiment, the forward end portion 70 of the first rotor shaft 30, particularly the outer surface 72, is allowed to spin beneath the tip portion 106 of the inlet guide vane 100, thereby breaking up and/or preventing ice buildup within the radial inlet 48 at the inlet guide vane 100 upstream from the compressor inlet 78. The seal body 86 prevents air and/or ice seepage through the radial gap 112 and into the compressor inlet 78.

Figure 4:
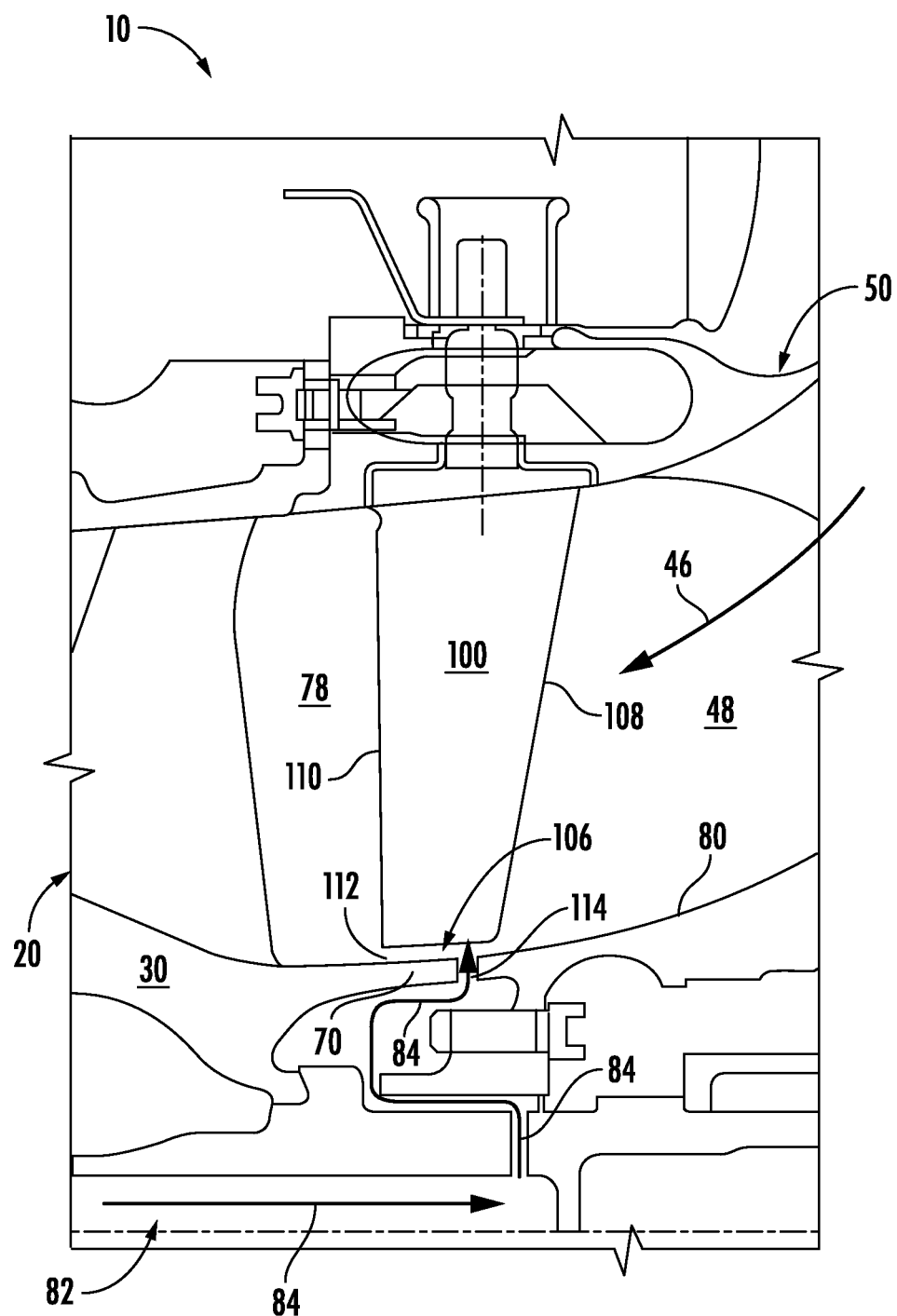
FIG. 4 is an enlarged schematic cross-sectional view of a portion of the gas turbine engine as shown in FIG. 1, including a portion of the inlet frame and a portion of the HP compressor in accordance with an exemplary embodiment of the present disclosure.

FIG. 4 is an enlarged schematic cross-sectional view of a portion of the gas turbine engine as shown in FIG. 1, including a portion of the inlet frame 50 and a portion of the HP compressor 20 in accordance with an exemplary embodiment of the present disclosure. The various components shown in FIG. 4 are similar to or the same as shown in FIGS. 2-3 and described herein and are numbered likewise. In the exemplary embodiment shown in FIG. 4, the axial gap or aperture 114 is defined between the forward end portion 70 of the first rotor shaft 30 and the inner wall 80 of the inlet frame 50 downstream from the leading-edge portion 108 and upstream from the trailing-edge portion 110 of the inlet guide vane 100 within the radial gap 112. In other words, the forward end portion 70 of the first rotor shaft 30 terminates axially aft from the leading-edge portion 108 of the inlet guide vane 100 within the radial gap 112. In operation, In the embodiment shown in FIG. 4, the forward end portion 70 of the first rotor shaft 30, particularly the outer surface 72, is allowed to spin beneath the tip portion 106 of the inlet guide vane 100 and the purge or extraction-air source 82, such as but not limited to the HP compressor 20, provides a flow of heated compressed air as indicated by arrows 84 through the aperture 114 and directly into the radial gap 112, thereby breaking up and/or preventing ice buildup within the radial inlet 48 at the inlet guide vane 100 upstream from the compressor inlet 78.

Figure 5:
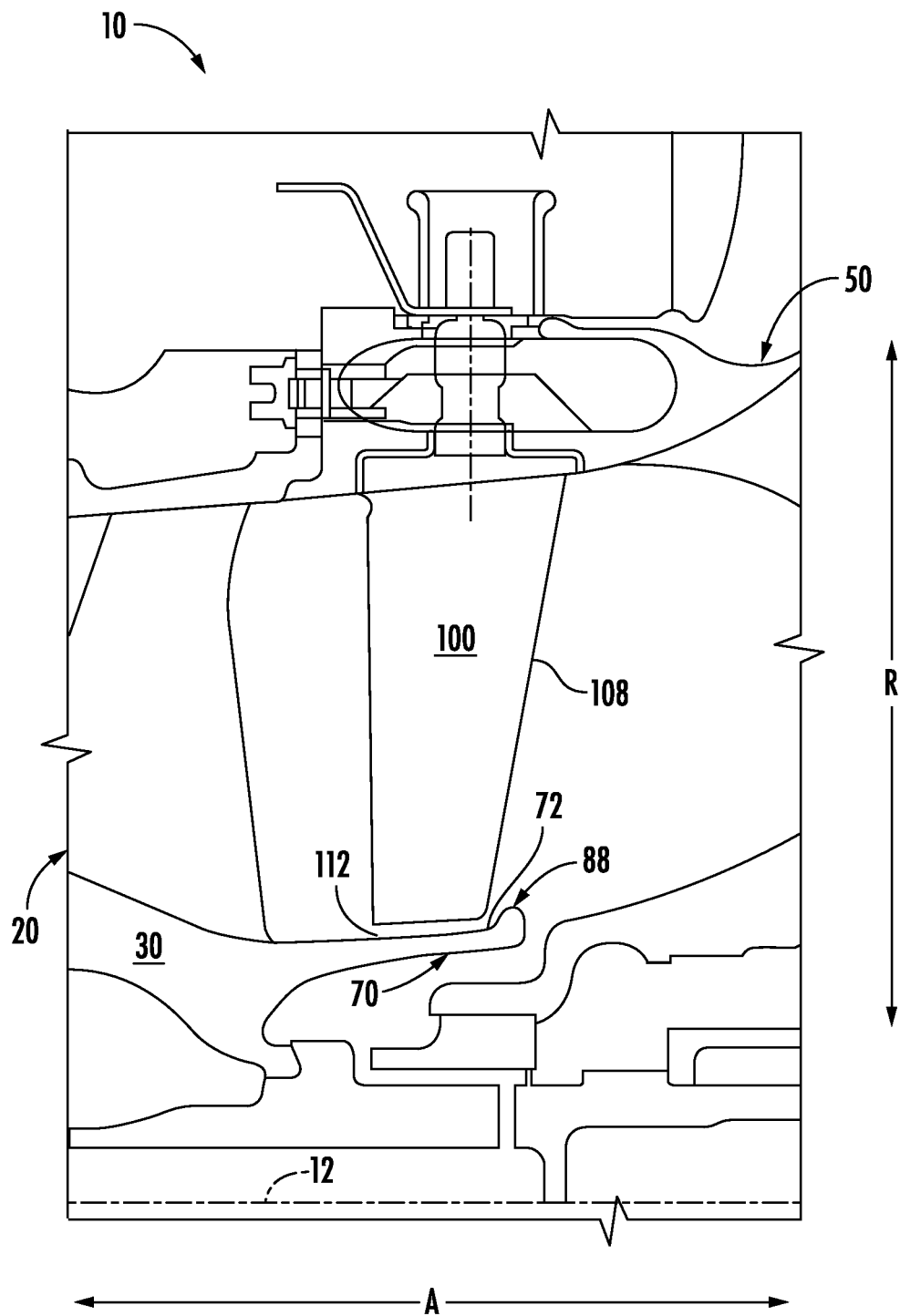
FIG. 5 is an enlarged schematic cross-sectional view of a portion of the gas turbine engine as shown in FIG. 1, including a portion of the inlet frame and a portion of the HP compressor in accordance with an exemplary embodiment of the present disclosure.
Figure 6:
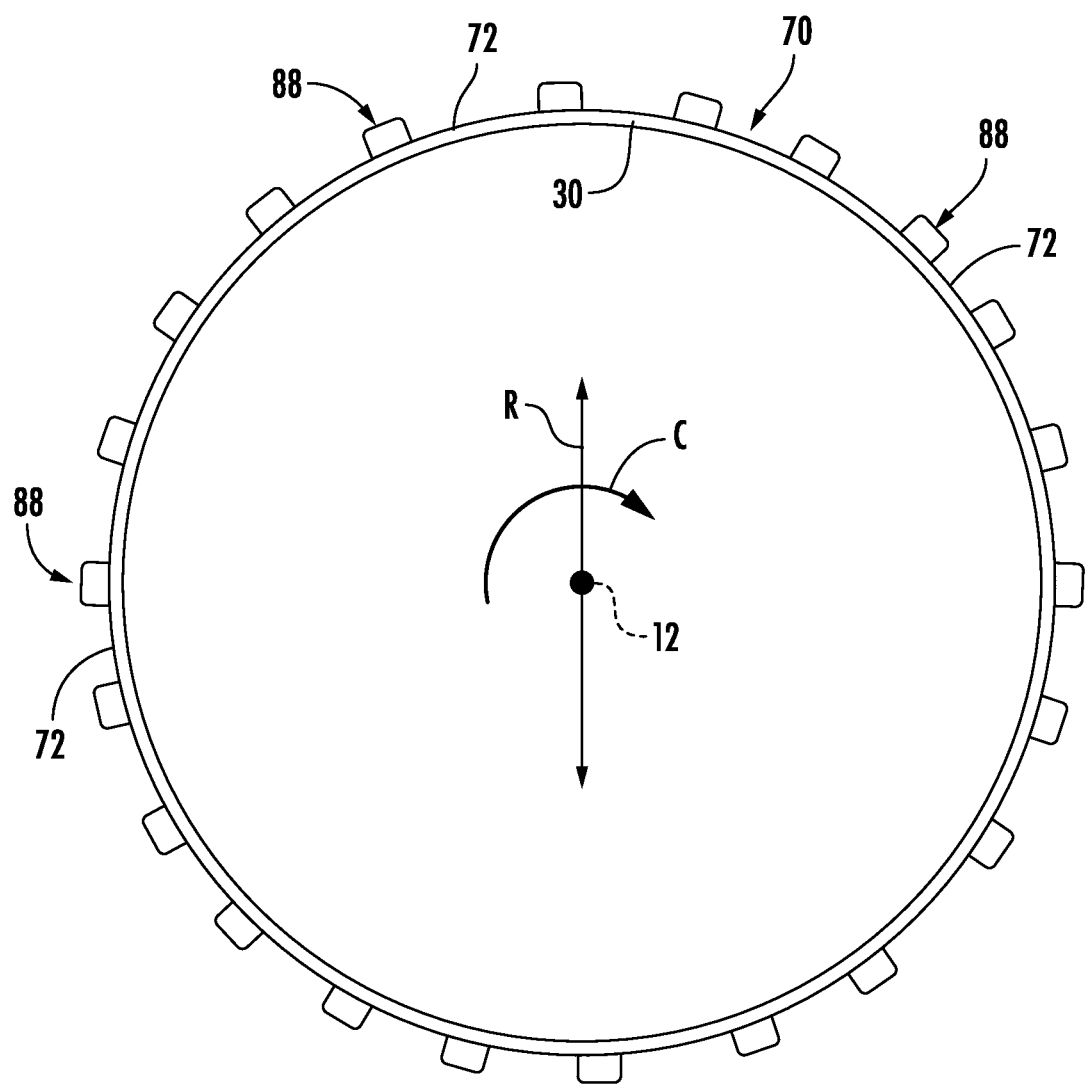
FIG. 6 is an aft looking forward schematic view of a forward portion of an exemplary rotor shaft according to an exemplary embodiment of the present disclosure.

FIG. 5 is an enlarged schematic cross-sectional view of a portion of the gas turbine engine as shown in FIG. 1, including a portion of the inlet frame 50 and a portion of the HP compressor 20 in accordance with an exemplary embodiment of the present disclosure. The various components shown in FIG. 5 are similar to or the same as those shown in FIGS. 2-4 and described herein and are numbered likewise. FIG. 6 is a schematic aft looking forward view of the forward end portion 70 of the first rotor shaft 30 according to an embodiment of the present disclosure. As shown in FIGS. 5 and 6 collectively, the first rotor shaft 30 includes a plurality of protrusions 88 circumferentially spaced with respect to circumferential direction "C" (FIG. 6) about the longitudinal centerline or central axis 12 of the turboprop engine 10 and extending radially outwardly from the outer surface 72 with respect to radial direction R. As shown in FIG. 5, the plurality of protrusions 88 is disposed upstream of the leading-edge portion 108 of the inlet guide vane 100 and the radial gap 112.

In the embodiment shown in FIGS. 5 and 6, the forward end portion 70 of the first rotor shaft 30, particularly the outer surface 72, is allowed to spin beneath the tip portion 106 of the inlet guide vane 100. The protrusions 88 break away any existing ice buildup and prevents or reduces the potential for new ice formation.

Figure 7:
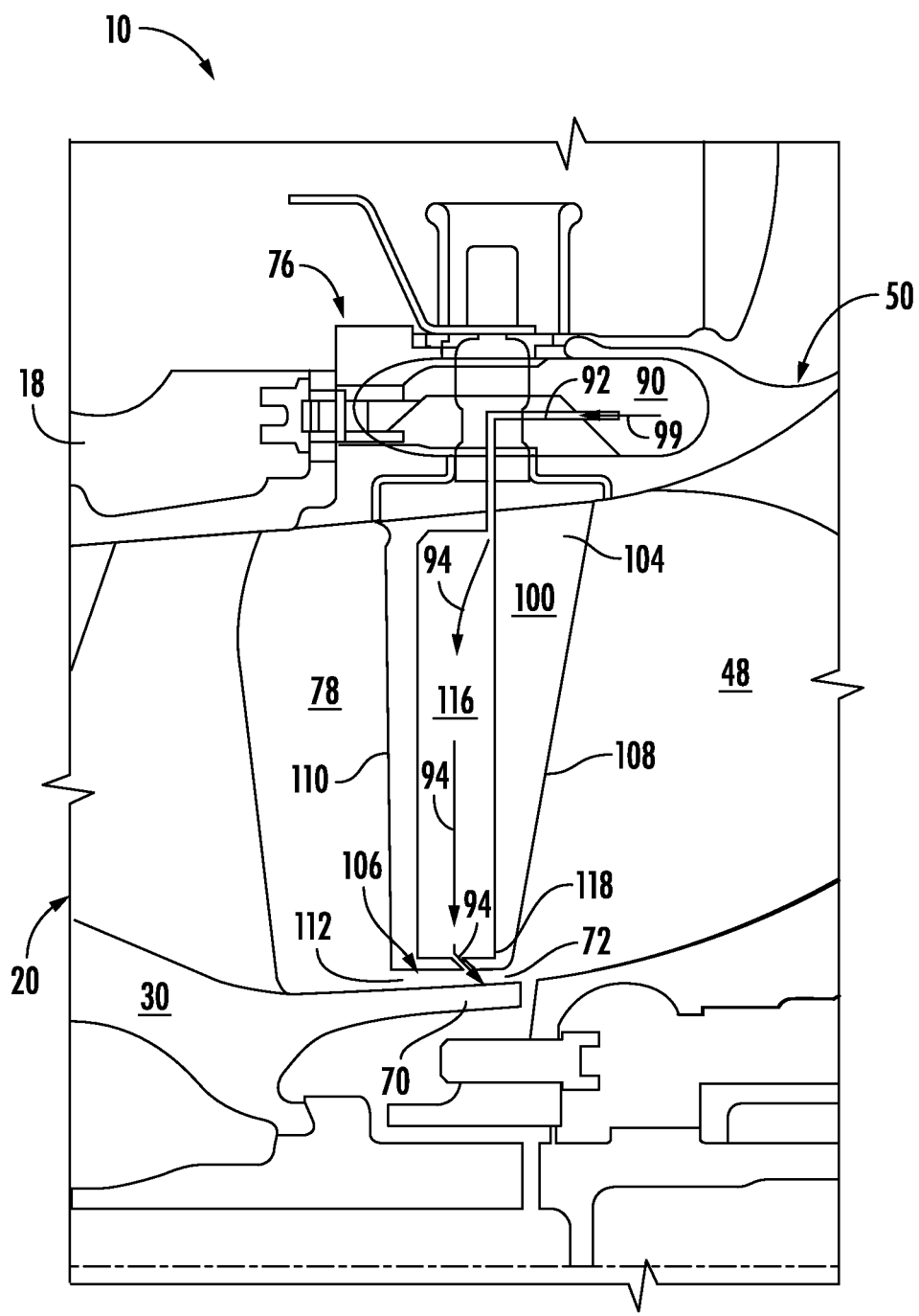
FIG. 7 is an enlarged schematic cross-sectional view of a portion of the gas turbine engine as shown in FIG. 1, including a portion of the inlet frame and a portion of the HP compressor in accordance with an exemplary embodiment of the present disclosure.

FIG. 7 is an enlarged schematic cross-sectional view of a portion of the gas turbine engine as shown in FIG. 1, including a portion of the inlet frame 50 and a portion of the HP compressor 20 in accordance with an exemplary embodiment of the present disclosure. The various components shown in FIG. 7 are similar to or the same as those shown in FIG. 2 and described herein and are numbered likewise. In the exemplary embodiment shown in FIG. 7 the inlet guide vane 100 or more particularly, the vane body 104, includes or defines an internal air passage 116. The internal air passage 116 is in fluid communication with a compressed air source 90 via an inlet 92 to the internal air passage 116 for receiving a flow of compressed air as indicated by arrows 94 from the compressed air source 90. The inlet guide vane 100 further includes or defines one or more outlets 118 defined along the tip portion 106 between the leading-edge portion 108 and the trailing-edge portion 110 of the inlet guide vane 100 within the radial gap 112.

In the embodiment shown in FIG. 7, the forward end portion 70 of the first rotor shaft 30, particularly the outer surface 72, is allowed to spin beneath the tip portion 106 of the inlet guide vane 100. The compressed air source 90 provides a flow of the compressed air as indicated by arrows 94 through the internal air passage 116 and out of the one or more outlets 118 directly into the radial gap 112, thereby melting and/or preventing ice buildup within the radial inlet 48 at the inlet guide vane 100 upstream from the compressor inlet 78.

Figure 8:
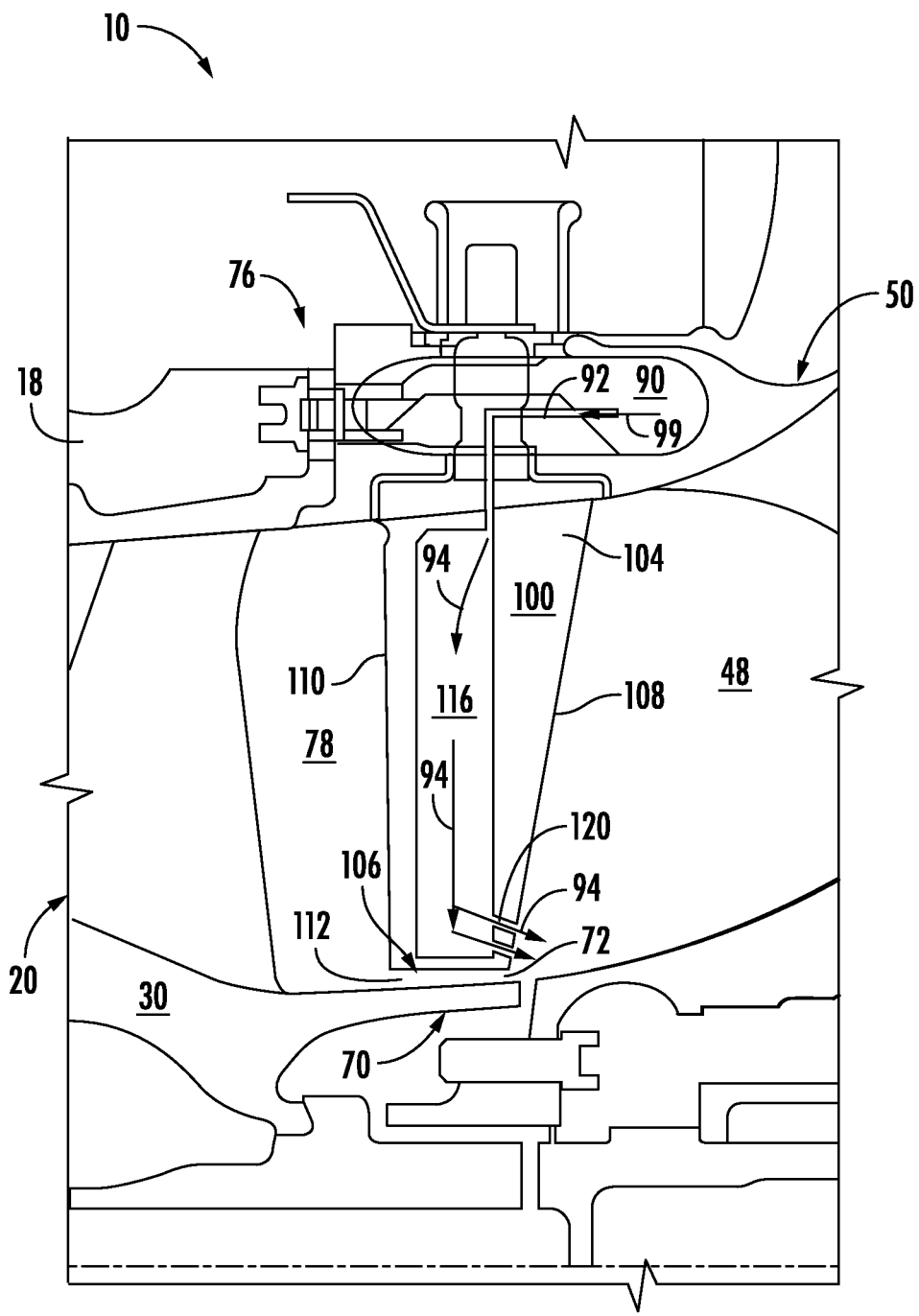
FIG. 8 is an enlarged schematic cross-sectional view of a portion of the gas turbine engine as shown in FIG. 1, including a portion of the inlet frame and a portion of the HP compressor in accordance with an exemplary embodiment of the present disclosure.

FIG. 8 is an enlarged schematic cross-sectional view of a portion of the gas turbine engine as shown in FIG. 1, including a portion of the inlet frame 50 and a portion of the HP compressor 20 in accordance with an exemplary embodiment of the present disclosure. The various components shown in FIG. 8 are similar to or the same as those shown in FIGS. 2 and 7 and described herein and are numbered likewise. In the exemplary embodiment shown in FIG. 8 the inlet guide vane 100 or more particularly, the vane body 104, includes or defines the internal air passage 116. The internal air passage 116 is in fluid communication with the compressed air source 90 via inlet 92 to the internal air passage 116 for receiving the flow of compressed air as indicated by arrows 94 from the compressed air source 90. The inlet guide vane 100 further includes or defines one or more outlets 120 defined along the leading-edge portion 108 proximate to the tip portion 106 of the inlet guide vane 100 upstream from the radial gap 112.

In the embodiment shown in FIG. 8, the forward end portion 70 of the first rotor shaft 30, particularly the outer surface 72, is allowed to spin beneath the tip portion 106 of the inlet guide vane 100. The compressed air source 90 provides a flow of the compressed air as indicated by arrows 94 through the internal air passage 116 and out of the one or more outlets 120 upstream form the radial gap 112, thereby melting and/or preventing ice buildup within the radial inlet 48 at the inlet guide vane 100 upstream from the compressor inlet 78.

The various embodiments disclosed herein and shown in FIG. 2-8 reduce or prevent ice accretion on the turboprop engine 10 particularly along the inner wall 80 of the inlet frame 50 at the inlet guide vane 100 due, at least in part, to the high rotational speed of the first rotor shaft 30. In addition, when heated compressed air is utilized, ice or water droplets are dispersed by means of the heated compressed air coming from the purge-air source into the radial gap and/or being introduced upstream from the leading-edge portion 108 of the inlet guide vane 100. In addition, the disclosure provides increased inlet guide vane 100 tip portion 106 temperatures by guiding the heated compressed air towards the radial gap 112. The ability to adjust the flowrate of the heated compressed air 84 or the compressed air 94 based on ground and inflight temperature conditions can be beneficial to overall engine performance and life expectancy.

Further aspects are provided by the subject matter of the following clauses:

A compressor, comprising: a rotor shaft comprising a forward end portion, wherein the forward end portion defines an outer surface and rotates with the rotor shaft; a first row of compressor rotor blades coupled to the rotor shaft downstream from the forward end portion; an outer casing at least partially surrounding the first row of compressor rotor blades and the outer surface of the forward end portion of the rotor shaft, the outer casing at least partially defining an inlet to the compressor; and an inlet guide vane comprising a mounting portion, a tip portion, a leading-edge portion, and a trailing-edge portion, wherein the mounting portion is coupled to the outer casing upstream from the first row of compressor rotor blades, wherein the tip portion extends towards the outer surface of the forward end portion of the rotor shaft, and wherein a radial gap is defined between the tip portion and the outer surface.

The compressor of the preceding clause, wherein the forward end portion of the rotor shaft and an inner wall of an inlet frame upstream from the inlet guide vane define an aperture therebetween, wherein the aperture is in fluid communication with a purge-air source, wherein the aperture is oriented to direct a flow of purge-air towards the radial gap.

The compressor of any preceding clause, wherein the forward end portion of the rotor shaft terminates axially forward of the leading-edge portion of the inlet guide vane.

The compressor of any preceding clause, further comprising a seal body disposed within the radial gap.

The compressor of any preceding clause, wherein the forward end portion of the rotor shaft and an inner wall of an inlet frame upstream from the inlet guide vane define an aperture therebetween, wherein the aperture is located between the leading-edge portion and the trailing-edge portion of the inlet guide vane, wherein the aperture is in fluid communication with a purge-air source, and wherein the aperture is oriented to direct a flow of purge air into the radial gap.

The compressor of any preceding clause, wherein the forward end portion of the rotor shaft terminates axially aft from the leading-edge portion of the inlet guide vane within the radial gap.

The compressor of any preceding clause, wherein the forward end portion of the rotor shaft includes a plurality of protrusions circumferentially spaced about and extending radially outwardly from the outer surface, wherein the plurality of protrusions is disposed upstream of the radial gap.

The compressor of any preceding clause, wherein the inlet guide vane includes an internal air passage having an inlet in fluid communication with a purge air source and an outlet defined along the leading-edge portion of the inlet guide vane upstream from the radial gap.

The compressor of any preceding clause, wherein the inlet guide vane includes an internal air passage having an inlet in fluid communication with a purge air source and an outlet defined within the radial gap.

The compressor of any preceding clause, wherein the outer casing includes an inlet frame, wherein the mounting portion of the inlet guide vane is coupled to the inlet frame.

A turboprop engine, comprising: a fan section, a compressor section, a combustion section, and a turbine section arranged in serial flow order, the compressor section comprising a compressor, wherein the compressor comprises: a rotor shaft comprising a forward end portion, wherein the forward end portion defines an outer surface and rotates with the rotor shaft; a first row of compressor rotor blades coupled to the rotor shaft downstream from the forward end portion; an outer casing at least partially surrounding the first row of compressor rotor blades and the outer surface of the forward end portion of the rotor shaft, the outer casing at least partially defining an inlet to the compressor; and an inlet guide vane comprising a mounting portion, a tip portion, a leading-edge portion, and a trailing-edge portion, wherein the mounting portion is coupled to the outer casing upstream from the first row of compressor rotor blades, wherein the tip portion extends towards the outer surface of the forward end portion of the rotor shaft, and wherein a radial gap is defined between the tip portion and the outer surface.

The turboprop engine of the preceding clause, wherein the forward end portion of the rotor shaft and an inner wall of an inlet frame upstream from the inlet guide vane define an aperture therebetween, wherein the aperture is in fluid communication with a purge-air source, wherein the aperture is oriented to direct a flow of purge-air towards the radial gap.

The turboprop engine of any preceding clause, wherein the forward end portion of the rotor shaft terminates axially forward of the leading-edge portion of the inlet guide vane.

The turboprop engine of any preceding clause, further comprising a seal body disposed within the radial gap.

The turboprop engine of any preceding clause, wherein the forward end portion of the rotor shaft and an inner wall of an inlet frame upstream from the inlet guide vane define an aperture therebetween, wherein the aperture is located between the leading-edge portion and the trailing-edge portion of the inlet guide vane, wherein the aperture is in fluid communication with a purge-air source, and wherein the aperture is oriented to direct a flow of purge air into the radial gap.

The turboprop engine of any preceding clause, wherein the forward end portion of the rotor shaft terminates axially aft from the leading-edge portion of the inlet guide vane within the radial gap.

The turboprop engine of any preceding clause, wherein the forward end portion of the rotor shaft includes a plurality of protrusions circumferentially spaced about and extending radially outwardly from the outer surface, wherein the plurality of protrusions is disposed upstream of the radial gap.

The turboprop engine of any preceding clause, wherein the inlet guide vane includes an internal air passage having an inlet in fluid communication with a purge air source and an outlet defined along the leading-edge portion of the inlet guide vane upstream from the radial gap.

The turboprop engine of any preceding clause, wherein the inlet guide vane includes an internal air passage having an inlet in fluid communication with a purge air source and an outlet defined within the radial gap.

The turboprop engine of any preceding clause, wherein the outer casing includes an inlet frame, wherein the mounting portion of the inlet guide vane is coupled to the inlet frame.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:
1. A compressor, comprising:
   a rotor shaft comprising a forward end portion, wherein the forward end portion defines an outer surface and rotates with the rotor shaft;
   a first row of compressor rotor blades coupled to the rotor shaft downstream from the forward end portion;

an outer casing at least partially surrounding the first row of compressor rotor blades and the outer surface of the forward end portion of the rotor shaft, the outer casing at least partially defining an inlet to the compressor; and an inlet guide vane comprising a mounting portion, and an airfoil including a tip portion, a leading-edge portion, and a trailing-edge portion, wherein the mounting portion is coupled to the outer casing upstream from the first row of compressor rotor blades, wherein the tip portion extends towards the outer surface of the forward end portion of the rotor shaft, and wherein a radial gap is defined by and between the tip portion of the airfoil and the outer surface of the rotor shaft, wherein the forward end portion of the rotor shaft and an inner wall of an inlet frame define an aperture therebetween, wherein the aperture is in fluid communication with a purge-air source, wherein the aperture is oriented to direct a flow of purge-air towards the radial gap.

2. The compressor of claim 1, wherein the forward end portion of the rotor shaft terminates axially forward of the leading-edge portion of the inlet guide vane.

3. The compressor of claim 1, further comprising a seal body disposed within the radial gap.

4. The compressor of claim 1, wherein the aperture is located between the leading-edge portion and the trailing-edge portion of the inlet guide vane, and wherein the aperture is oriented to direct a flow of purge air into the radial gap.

5. The compressor of claim 1, wherein the forward end portion of the rotor shaft terminates axially aft from the leading-edge portion of the inlet guide vane.

6. The compressor of claim 1, wherein the forward end portion of the rotor shaft includes a plurality of protrusions circumferentially spaced about and extending radially outwardly from the outer surface, wherein the plurality of protrusions is disposed upstream of the radial gap.

7. The compressor of claim 1, wherein the inlet guide vane includes an internal air passage having an inlet in fluid communication with a purge air source and an outlet defined along the leading-edge portion of the inlet guide vane upstream from the radial gap.

8. The compressor of claim 1, wherein the inlet guide vane includes an internal air passage having an inlet in fluid communication with a purge air source and an outlet defined within the radial gap.

9. The compressor of claim 1, wherein the outer casing includes an inlet frame, wherein the mounting portion of the inlet guide vane is coupled to the inlet frame.

10. A turboprop engine, comprising:
a fan section, a compressor section, a combustion section, and a turbine section arranged in serial flow order, the compressor section comprising a compressor, wherein the compressor comprises:
a rotor shaft comprising a forward end portion, wherein the forward end portion defines an outer surface and rotates with the rotor shaft;
a first row of compressor rotor blades coupled to the rotor shaft downstream from the forward end portion;
an outer casing at least partially surrounding the first row of compressor rotor blades and the outer surface of the forward end portion of the rotor shaft, the outer casing at least partially defining an inlet to the compressor; and
an inlet guide vane comprising a mounting portion, and an airfoil including a tip portion, a leading-edge portion, and a trailing-edge portion, wherein the mounting portion is coupled to the outer casing upstream from the first row of compressor rotor blades, wherein the tip portion extends towards the outer surface of the forward end portion of the rotor shaft, and wherein a radial gap is defined by and between the tip portion of the airfoil and the outer surface of the rotor shaft, wherein the forward end portion of the rotor shaft and an inner wall of an inlet frame define an aperture therebetween, wherein the aperture is in fluid communication with a purge-air source, wherein the aperture is oriented to direct a flow of purge-air towards the radial gap.

11. The turboprop engine of claim 10, wherein the forward end portion of the rotor shaft terminates axially forward of the leading-edge portion of the inlet guide vane.

12. The turboprop engine of claim 10, further comprising a seal body disposed within the radial gap.

13. The turboprop engine of claim 10, wherein the aperture is located between the leading-edge portion and the trailing-edge portion of the inlet guide vane, and wherein the aperture is oriented to direct a flow of purge air into the radial gap.

14. The turboprop engine of claim 10, wherein the forward end portion of the rotor shaft terminates axially aft from the leading-edge portion of the inlet guide vane.

15. The turboprop engine of claim 10, wherein the forward end portion of the rotor shaft includes a plurality of protrusions circumferentially spaced about and extending radially outwardly from the outer surface, wherein the plurality of protrusions is disposed upstream of the radial gap.

16. The turboprop engine of claim 10, wherein the inlet guide vane includes an internal air passage having an inlet in fluid communication with a purge air source and an outlet defined along the leading-edge portion of the inlet guide vane upstream from the radial gap.

17. The turboprop engine of claim 10, wherein the inlet guide vane includes an internal air passage having an inlet in fluid communication with a purge air source and an outlet defined within the radial gap.

18. The turboprop engine of claim 10, wherein the outer casing includes an inlet frame, wherein the mounting portion of the inlet guide vane is coupled to the inlet frame.

19. A turboprop engine, comprising:
a fan section, a compressor section, a combustion section, and a turbine section arranged in serial flow order, the compressor section comprising a compressor, wherein the compressor comprises:
a rotor shaft comprising a forward end portion, wherein the forward end portion defines an outer surface and rotates with the rotor shaft;
a first row of compressor rotor blades coupled to the rotor shaft downstream from the forward end portion;
an outer casing at least partially surrounding the first row of compressor rotor blades and the outer surface of the forward end portion of the rotor shaft, the outer casing at least partially defining an inlet to the compressor; and
an inlet guide vane comprising a mounting portion, and an airfoil including a tip portion, a leading-edge portion, and a trailing-edge portion, wherein the mounting portion is coupled to the outer casing upstream from the first row of compressor rotor blades, wherein the tip portion extends towards the outer surface of the forward end portion of the rotor shaft, and wherein a radial gap is defined by and between the tip portion of the airfoil and the outer surface of the rotor shaft, wherein the inlet guide vane includes an internal air passage having an inlet in fluid communication with a purge air source and an outlet defined along the leading-edge portion of the inlet guide vane upstream from the radial gap.

20. The turboprop engine of claim 19, wherein the internal air passage further comprises a second outlet, wherein the second outlet is defined within the radial gap.

* * * * *